United States Patent
Yu et al.

(10) Patent No.: US 7,994,946 B2
(45) Date of Patent: Aug. 9, 2011

(54) SYSTEMS AND METHODS FOR SCALABLY ENCODING AND DECODING DATA

(75) Inventors: Rongshan Yu, Singapore (SG); Xiao Lin, Singapore (SG); Susanto Rahardja, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 993 days.

(21) Appl. No.: 11/628,951

(22) PCT Filed: Jun. 7, 2004

(86) PCT No.: PCT/SG2004/000169
§ 371 (c)(1),
(2), (4) Date: Sep. 19, 2007

(87) PCT Pub. No.: WO2005/122408
PCT Pub. Date: Dec. 22, 2005

(65) Prior Publication Data
US 2011/0001642 A1    Jan. 6, 2011

(51) Int. Cl.
*H03M 7/34* (2006.01)
(52) U.S. Cl. .............................. 341/51; 341/65; 375/240
(58) Field of Classification Search .................. 341/51; 370/240
See application file for complete search history.

(56) References Cited

U.S. PATENT DOCUMENTS

| | | | |
|---|---|---|---|
| 5,473,631 A | 12/1995 | Moses | 375/202 |
| 6,092,041 A | 7/2000 | Pan et al. | 704/229 |
| 6,678,647 B1 | 1/2004 | Edler et al. | 704/200.1 |
| 6,871,106 B1 | 3/2005 | Ishikawa et al. | |
| 7,072,366 B2 * | 7/2006 | Parkkinen et al. | 370/538 |
| 2003/0067637 A1 | 4/2003 | Hannuksela | 358/504 |
| 2007/0160126 A1 * | 7/2007 | Van Der Meer et al. | 375/240 |
| 2007/0217503 A1 * | 9/2007 | Haskell et al. | 375/240.1 |

FOREIGN PATENT DOCUMENTS

| | | |
|---|---|---|
| EP | 0 555 016 | 1/1993 |
| EP | 0 559 383 | 2/1993 |
| EP | 1 331 822 | 1/2002 |
| JP | 7170194 | 7/1995 |
| JP | 11330977 | 11/1999 |
| WO | WO 97/21293 | 12/1995 |

OTHER PUBLICATIONS

Khalid Sayhood, *Introduction to Data Compression*, Morgan Kaufmann, 2000, Chapters 3 and 4.

Geiger et al. Fine Grain Scalable Perceptual and Lossless Audio Coding Based on INTMDCT IEEE International Conference on Acoustics, Speech and Signal Processing (ICASSP), Hong Kong, Apr. 6-10, 2003, 4 pages.

(Continued)

*Primary Examiner* — Khai M Nguyen
(74) *Attorney, Agent, or Firm* — Paul J. Backofen, Esq.; Crockett & Crockett, PC

(57) ABSTRACT

Systems and methods for scalably encoding and decoding coded data are presented. One exemplary method for scalably coding data includes classifying, based upon at least one predetermined criteria, each of the plurality of data received as either (i) perceptually relevant data or (ii) perceptually irrelevant data. The perceptually relevant data is scalably coded, and the perceptually irrelevant data is non-scalably coded. Subsequently, the scalably coded perceptually relevant data and the non-scalably coded perceptually irrelevant are combined into a coded data stream for transmission.

50 Claims, 6 Drawing Sheets

OTHER PUBLICATIONS

Raad et al. From Lossy to Lossless Audio Coding Using SPIHT 5$^{th}$ Conference on Digital Audio Effects(DAFx-02) Hamburg, Germany, Sep. 26-28, 2002, 6 pages.

Yu et al. Proposed Core Experiment for Improving Coding Efficiency in MPEG-4 Audio Scalable Coding IS/IEC JTC1/SC29/WG11, MPEG2003, Brisbane, Australia, Oct. 2003, 10 pages.

J. Li, Embedded Audio Coding (EAC) With Implicit Auditory Masking ACM Multimedia 2002, Nice, France, Dec. 2002, 10 pages.

Geiger et al. INTMDCT-A Link Between Perceptual Ands Lossless Audio Coding Proc. ICASSP, 2002, Orlando 2002, 4 pages.

Moriya et al. A Design of Lossy and Lossless Scalable Audio Coding Proc. ICASSP, 2000, pp. 889-892.

Yu et al. Bit-Plane Golomb Coding for Sources With Laplacian Distributions Proc. ICASSP, 2003, 4 pages.

Yu et al. A Fine Granular Scalable Perceptually Lossy and Lossless Audio Codec Proc. ICASSP, 2003, 4 pages.

Said et al. *A New, Fast, and Efficient Image Codec Based on Set Partitioning in Hierarchical Trees* IEEE Transactions on Circuits and Systems for Video Technology, vol. 6, No. 3, pp. 243-250, Jun. 1996.

\* cited by examiner

SYSTEMS AND METHODS FOR SCALABLY ENCODING AND DECODING DATA

The present application refers to methods and systems for scalably encoding data as well to a respective computer program product resident on a computer readable medium.

With the proliferation of digital technology in the past decades, digital audiovisual formats have essentially replaced their analog counterparts as the mainstream carrier for multimedia contents and have been widely adopted in numerous multimedia applications, such as CD/DVD, Digital TV, Video on demand (VoD), and Network radio, etc. By and large, digital multimedia signal is characterized by high data rates and delivery through communication channel would inevitably require compression technologies before transmission. Nowadays, there are a lot of data compression technologies that are specifically designed for compression of multimedia signals, e.g., H.263 and MPEG 4 video for video signal, MPEG audio layer III (mp3), MPEG-AAC and Dolby AC-3 for audio signal, and G.723.1 and AMR for speech signal, and many of them are widely deployed.

Recently, the universal multimedia access (UMA) paradigm has been emerging as an important technology for multimedia communication where the audiovisual contents are delivered to various playback devices with different capabilities through a heterogeneous access networks, and consumed by users with very diverse preferences. The UMA paradigm has placed some new constraints on the digital audiovisual formats in its framework; in particular, in order to cater for various network bandwidth conditions, as well as the diversity in the device capabilities and user preferences, the digital formats should provide the scalabilities that quality of its contents can be easily made adaptive within the delivering network. This scalability is usually accomplished by employing the scalable coding technology, which generate a scalable bit-stream that can be easily truncated to lower data rates, and in turn, decoded to audiovisual presentation with lower qualities.

In principle, a scalable bit-stream can be constructed via a "layered" structure which is demonstrated in the FIG. 1. In a layered structure, the input signal is first passed through a base layer encoder to generate the base layer bit-stream, which represents the minimum quality/rate representation of the original signal. The difference, or error signal obtained by subtracting reconstruction signal of the base layer bit-stream to the original is then encoded with an enhanced layer encoder to generate the enhanced layer bit-stream. The process can be continued so on and so forth to generate multi enhanced layer bit-stream as illustrated in FIG. 1. The base layer bit-stream is then multiplex with the enhanced layer bit-streams to produce the scalable bit-stream (FIG. 2). In the decoder, the base layer bit-stream and the multi enhanced layer bit-stream are parsed from the scalable bit-stream and the outputs are simply added together to generate the decoded output. While there are other approaches to achieve scalable coding, e.g., the bit-plane coding approach in image coding, they are fundamentally the same in the coding mechanism as the approach described above.

The advantage of this scalable coding approach lies in its ability to adapt its quality of the reconstruction to the network bandwidth as well as the devices capabilities and the user preferences. For example, in an application that streams a multimedia signal through a variable bandwidth communication channel, a scalable coding system can generate a bit-stream that can adapt its bit-rate according to the available bandwidth of the communication channel during the transmission; when the available bandwidth becomes insufficient for the full rate bit-stream, the transmission system can simply discard some enhanced layer bit-streams to reduce its bit-rate so that it can still be transmitted through the communication channel. In this case, instead of interrupting the streaming program as in the case of steaming a non-scalable bit-stream, the receiving terminal only suffer slightly quality degradation, but can still enjoy a continues streaming program which is generally more favorable from the user's point of view.

Despite its advantages, a scalable coding system is usually inferior to a non-scalable coding system in terms of the coding efficiency and complexity. That is, when working at a certain given data rate, a scalable system will generally result in reconstruction with worse quality compared with a non-scalable coding system which results from the fact that the layer structure of a scalable coding system limits the freedom of the encoder to optimize to a certain target rate as it does in a non-scalable coding system. In addition, a scalable coding system is usually more complex than a non-scalable one in both its structure and the computation power demanded in the coding/decoding process.

Accordingly, what is needed is a system and method for coding data which includes the advantageous features of both scalable and non-scalable systems.

SUMMARY OF THE INVENTION

The present invention provides a hybrid scalable/non-scalable system (HSNS) for coding a data stream, such as multimedia signals. The system is based upon the observation that not all the components in the data stream need be scalable coded. In particular, it is inefficient to scalable code perceptually irrelevant components, as the goal for a scalable coding system is to achieve the perceptual quality vs. data rate scalability; and those perceptually irrelevant components (e.g., data outside the range of human perception such as sight and vision) do not, by definition, contribute to the final perceptual quality of the reconstruction. For these data components, the systems and methods of the present invention employ a non-scalable coder. This hybrid scaling and non-scaling technique is thus operable to provide a scalable bit stream, while incorporating the advantages of a non-scalable system.

A method of scalably encoding coded data in accordance with one embodiment of the invention includes receiving a data stream comprising a plurality of data, and classifying, based upon at least one predetermined criteria, each of the plurality of data as either (i) perceptually relevant data or (ii) perceptually irrelevant data. Perceptually relevant data includes that data which corresponds to information within the sensory range of a particular party, for example, data corresponding to audio and/or video information within an average person's audio and visual range. Conversely, perceptually irrelevant data will comprise that data which corresponds to information generally outside (either higher or lower) of the party's sensory range.

Next, the perceptually relevant data is scalably coded, and the perceptually irrelevant data is non-scalably coded. Non-exhaustive examples of non-scalable coding include sample-by-sample coding with Huffman and arithmetic code, and an exemplary embodiment of scalable encoding includes layered coding and bit-plane encoding. Subsequently, the scalably coded perceptually relevant data and the non-scalably coded perceptually irrelevant are combined into (e.g., multiplexed onto) a coded data stream for transmission.

A system operable to scalably encode data in accordance with one embodiment of the invention includes a perceptual relevance classifier, a scalable coder, a non-scalable coder, and a multiplexer. The system includes an input configured to receive a data stream comprising a plurality of data, the perceptual relevance classifier operable to classify, based upon at least one predetermined criteria, each of the plurality of data as either (i) perceptually relevant data, or (ii) perceptually irrelevant data. The scalable coder has an input coupled to receive the perceptually relevant data and to apply scalable coding thereto to produce coded perceptually relevant data. The non-scalable coder has an input coupled to receive the perceptually irrelevant data and to apply non-scalable coding thereto to produce coded perceptually irrelevant data. The multiplexer has first and second inputs coupled to receive the coded perceptually relevant and irrelevant data, respectively, the multiplexer operable to combine the coded perceptually relevant and irrelevant data into a coded data stream.

In an optional feature of the invention, a perceptual relevance classification (PRC) record is generated during the encoding process, the PRC record including information as to which data has been deemed perceptually relevance and which data perceptually irrelevant. When implemented, the PRC record can be used to reconstruct a copy of the original data stream in the decoder. Further optionally, the encoder and decoder may employ domain transformation techniques to facilitate data processing. Such transforms may include the discrete fourier, discrete cosine, discrete wavelet and discrete sine transforms, for example.

These and other features of the invention will be more fully understood when read in light of the following description and figures.

These and other features of the present invention will be better understood when viewed in light of the following drawings and detailed description.

DETAILED DESCRIPTION OF SPECIFIC EMBODIMENTS

Figure 1:
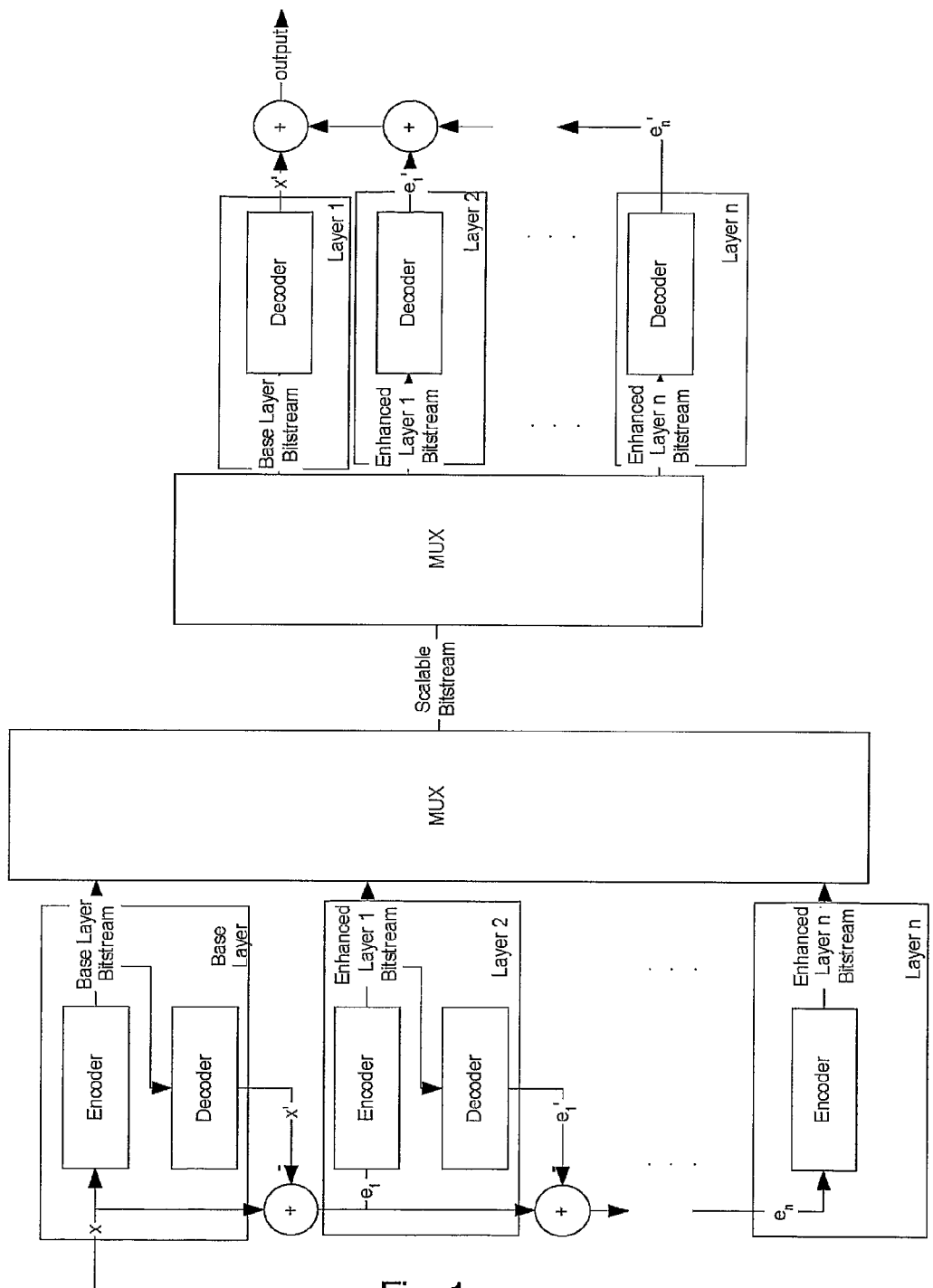
FIG. 1 illustrates a conventional scalable coding system as known in the art.
Figure 2:
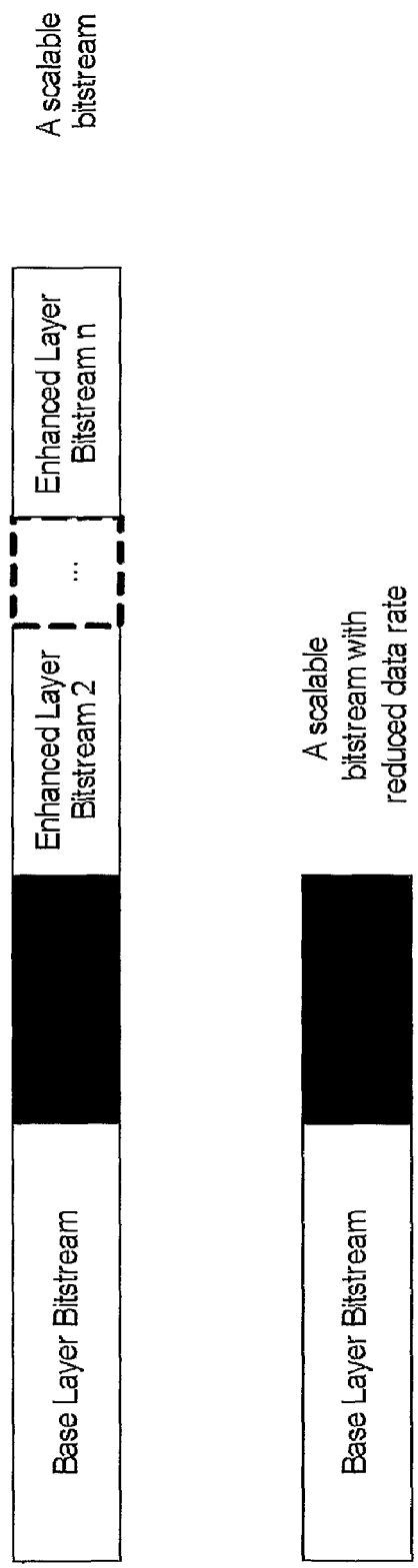
FIG. 2 illustrates scalable bit streams which are produced by the conventional scalable coding system of FIG. 1.
Figure 3A:
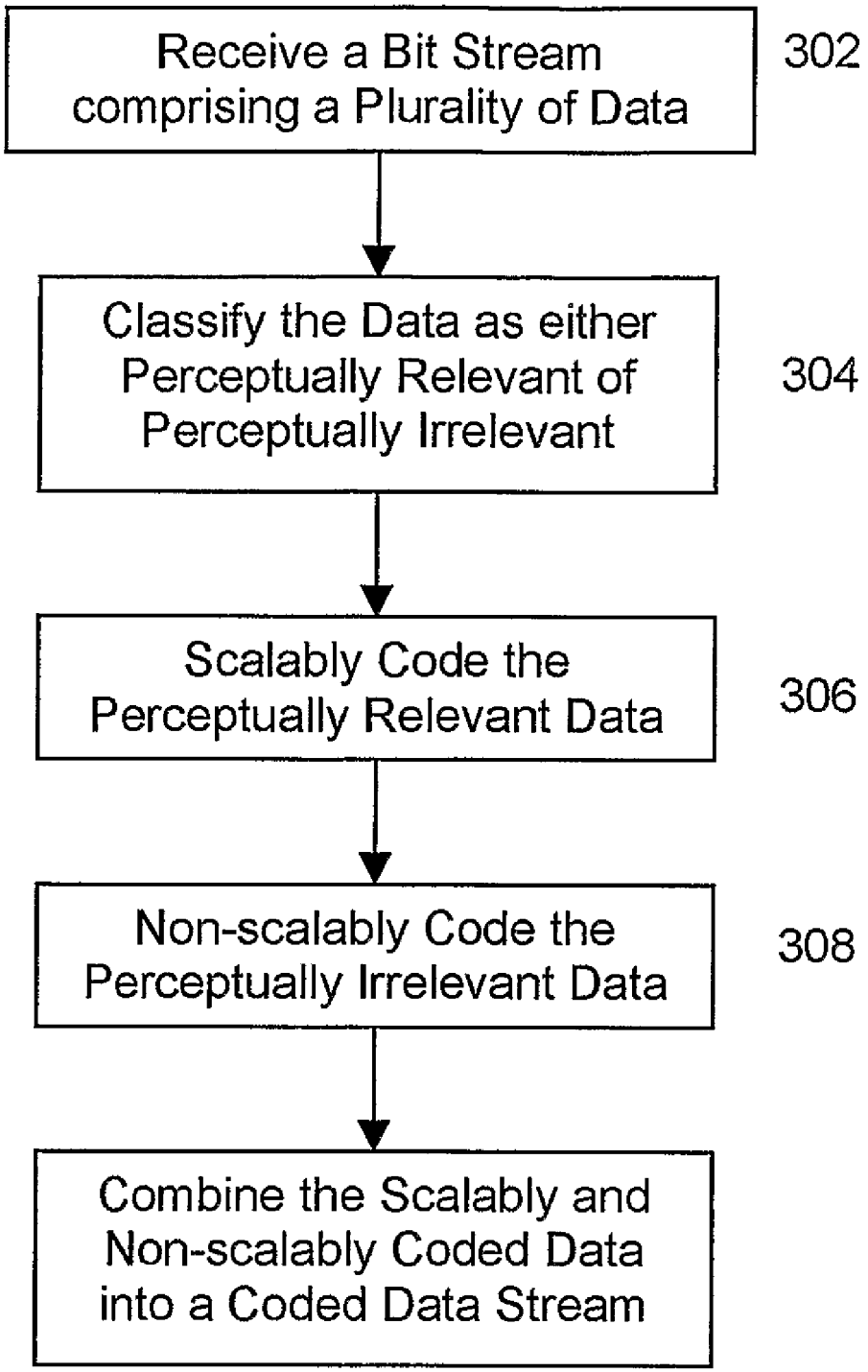
FIGS. 3A and 3B illustrate respective methods for scalably encoding and decoding data in accordance with one embodiment of the present invention.
Figure 3B:
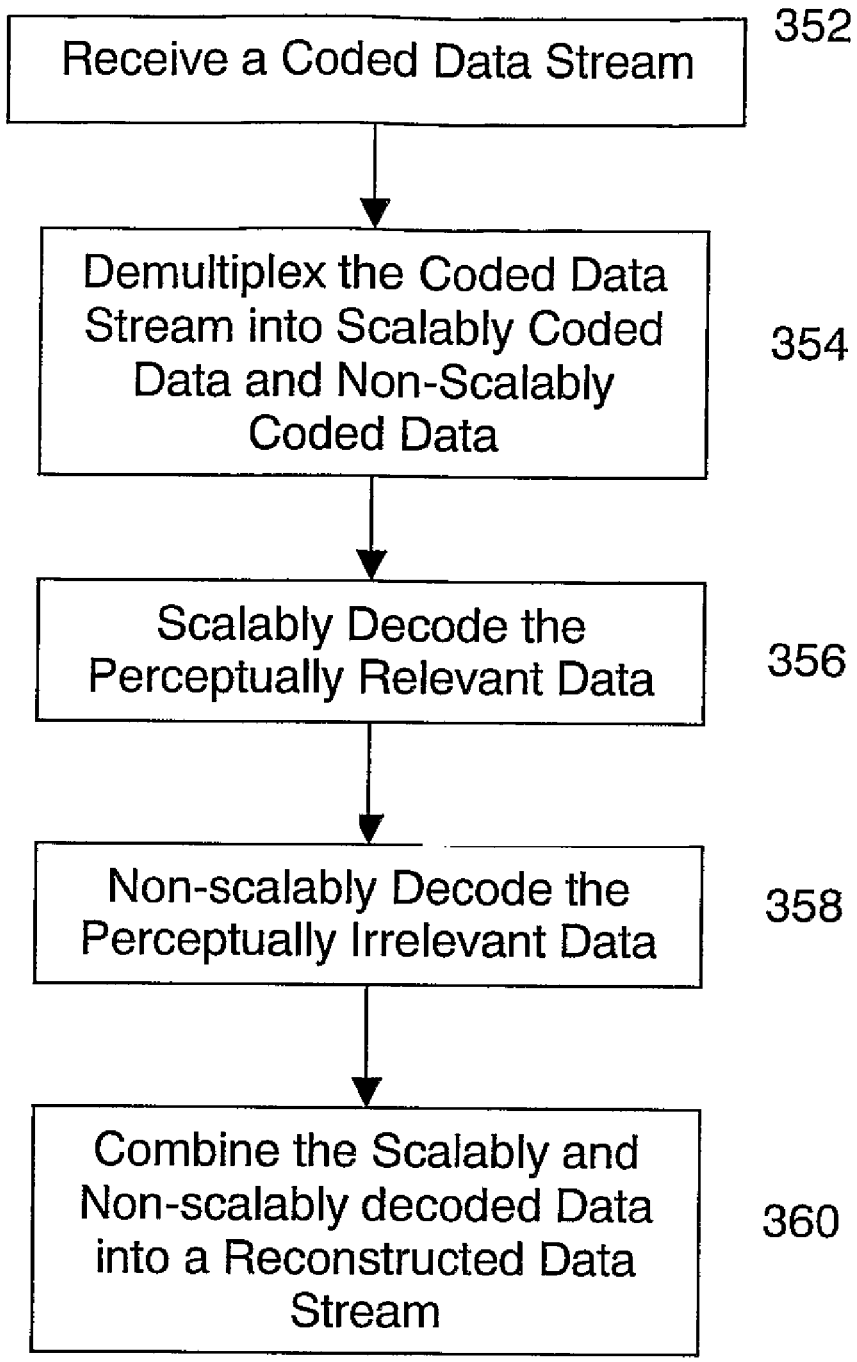

FIGS. 3A and 3B illustrates respective methods for scalably encoding and decoding data in accordance with one embodiment of the present invention. Referring first to the encoding method shown in FIG. 3A, an input signal comprising a plurality of data is initially received at 302. The input signal may undergo some intermediate processing, as will exemplified below, however this is not necessary for the operation of the invention.

Next at 304, each of the received data is classified as being either (i) perceptually relevant or (ii) perceptually irrelevant. The classification involves for each data, comparing the level of one or more predetermined criteria to a threshold value, the data being deemed perceptually relevant or irrelevant depending upon the outcome of the comparison. Exemplary categories of the predetermined criteria include the data's frequency, energy level, or its perceptual significance estimated by using the perceptual model for the human perceptual system.

When, for example, energy level is selected as the classification criterion, perceptual relevance of a data $x_i, i=0, \ldots, L-1$ is determined using the equation:

$$= \frac{1}{L}\sum_{i=0}^{L-1} x_i^2 < THR \qquad (1)$$

where THR is a predetermined threshold value, below which the coefficient is determined to be perceptually irrelevant.

Alternatively, the absolute mean value level of the coefficient can be used as a classification criteria:

$$\frac{1}{L}\sum_{i=0}^{L-1} |x_i| < THR \qquad (2)$$

In another embodiment, perceptual significance is estimated by means of a perceptual model for the human perceptual system. In such an embodiment, the following ratio to the masking threshold may be used:

$$\frac{\frac{1}{L}\sum_{i=0}^{L-1} x_i^2}{JND} < THR, \qquad (3)$$

where JND is the level of the just noticeable distortion for that signal. This criteria is conventionally used in perceptual audio coding where the JND is the masking threshold evaluated by using a psychoacoustics model. See, for example, J. D. Johnston, Transform coding of audio signals using perceptual noise criteria, pp 314-323, IEEE Journal on Selected Areas in Communications, Volume: 6, Issue: 2, February 1988.

Next at 306, the data which has been classified as perceptually irrelevant is non-scalably coded. Numerous types of non-scalable coding can be used in this process, the selection of which will mostly depend upon the particular data format and content. In an exemplary embodiment in which the data comprises imaging data, scalable coding may be performed using sample-by-sample Huffman or arithmetic encoding. These are only a few examples of the type of coding possible, and those of skill in the art will appreciate that there are many others applicable under the present invention.

Subsequently at 308, the data classified as perceptually relevant is scalably coded. This process is also implementable in numerous ways, one example being bit-plane coding as described in may be a Bit-plane coder as described in "A New, Fast, and Efficient Image Codec based on Set Partitioning in Hierarchical Trees," A. Said and W. A. Pearlman, IEEE Transactions on Circuits and Systems For Video Technology, vol. 6, no. 3, pp. 243-250, June 1996, or "Bit Plane Golomb Coding for Sources with Laplacian Distributions," R. Yu and et al, ICASSP 2003. Those skilled in the art will appreciate that other scaling processes may also be implemented in alternative embodiments under the present invention.

Next at 310, the scalably and non-scalably coded data are multiplexed onto a coded data stream. This process may be implemented by a conventional multiplexer or such equivalent hardware, software of firmware.

Referring next to FIG. 3B in which a method for scalably decoding a signal is presented, the process begins at 352 by receiving a coded data stream, the coded data stream comprising both scalable and non-scalable data. Next at 354, the coded data stream is de-multiplexed into separate streams of scalably coded data and non-scalably coded data. This operation may be performed by a demultiplexer or some such equivalent device in hardware, software or firmware.

Subsequently at 356, the stream of scalable coded data is decoded. This process will typically employ the inverse process of the encoding technique selecting in 306 above. Similarly, at 358, the stream of non-scalably coded data is decoded, also preferably using the inverse process of the encoding process selected in 308. The perceptually relevant and irrelevant decoded data is subsequently combined at 360 to form a reconstructed version of the input data supplied in 302.

Figure 4:
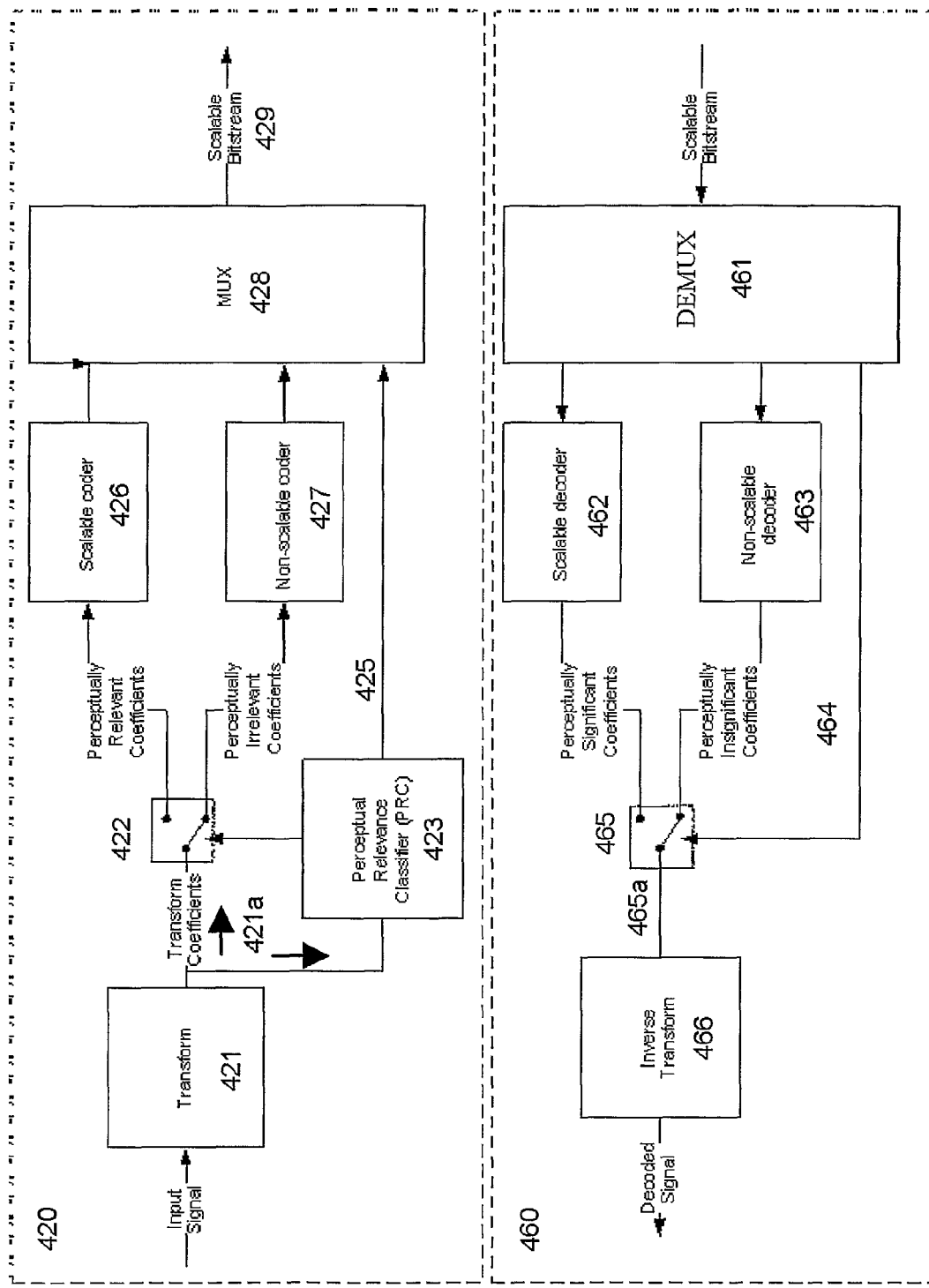
FIG. 4 illustrates a scalable encoder and scalable decoder in accordance with one embodiment of the present invention.

FIG. 4 illustrates an exemplary encoder and decoder in accordance with embodiments of the present invention. Referring first to the encoder 420, the system includes an optional transform module 421, a switch 422 (a single-pole, double throw switch in one embodiment), a perceptual relevance classifier 423, a scalable coder 426, a non-scalable coder 427, and a multiplexer 428. As those of skill in the art will appreciate, the components may be realized as software modules, firmware or hardware, or a combination of these implementation modalities.

The transform module 420 is an optional component of the present invention, but may be used in particular embodiments. When so used, it is operable to domain transform the input signal to a stream of transform coefficients 421a, for example transforming a sequence of time or spatial coefficients to a corresponding sequence of frequency coefficients. The transform module may employ any particular transform, a few possible examples being the discrete cosine transform, the discrete fourier transform, the discrete sine transform, the discrete wavelet transform, modified versions of these, as well as others. In a particular embodiment, the transform module performs the transformation operation as described in applicant's concurrently filed application entitled "Method for Transforming a Digital Signal form the Time Domain into the Frequency Domain and Vice Versa," herein incorporated by reference. Further particularly, the input signal is processed as two parallel input data blocks, the transformation resulting in the generation of two transform coefficient blocks. Embodiments of this process are further described the applicant's concurrently filed applications. Once generated, the transform coefficients are then supplied to a single-pole switch 422 and to the perceptual relevance classifier 423.

The perceptual relevance classifier (PRC) 423 receives the transform coefficients, and determines, based upon a predetermined criteria, whether the transform coefficient is perceptually relevant or not. Exemplary categories of the predetermined criteria include the coefficient's frequency, energy level, or perceptual significance estimated by using a perceptual model as described above. In a particular embodiment in which an integer modified discrete cosine transform (IntMDCT) is used to transform an input signal, for example, an audio signal, perceptual relevance is based upon whether the signal coefficients have an average absolute value of less than 1, as in this case the signal is mainly dominated with rounding errors in the IntMDCT operation instead of the real audio signal. Those skilled in the art will appreciate that of course other selection criteria may be used, and that the invention is not limited to the exemplary criteria illustrated here.

Responsive to its classification, the PRC 423 controls the output state of the switch 422 to output the perceptually relevant data to the scalable encoder 426, and the perceptually irrelevant data to the non-scalable encoder 427. The two groups of data are then coded by their respective coders and combined onto a scalable bit stream 429 by use of a multiplexer 428. The scalable and non-scalable coders may consist of any hardware, software or firmware implementations of coding systems running the desired coding operations, such as bit-plane coding, Huffman coding, arithmetic coding, as well as others. The invention is not limited to a particular coding algorithm, and those skilled in the art will appreciate that many forms of scalable and non-scalable coding can be implemented under the present invention.

Optionally, a PRC record 425 containing information as to which data (coefficients) were classified as perceptually relevant and irrelevant is generated, supplied to the multiplexer 428 and combined onto the bit stream 429 for transmission to the decoder 460. In a particular embodiment, the PRC record 425 is appended as a preamble of the bit stream so as to inform the decoder which data are perceptually relevant before processing the stream.

Referring now to the encoder 460, it includes a de-multiplexer 461, scalable and non-scalable decoders 462 and 463, a switch 465, and an optional inverse transform module 466. The de-multiplexer 461 is operable to receive the scalable bit stream transmitted from the encoder 420 or equivalent thereof, and separately outputting the perceptually relevant coded data to the scalable decoder 462, the perceptually irrelevant coded data to non-scalable decoder 463, and the optionally included PRC record to the switch 464. The scalable and non-scalable decoders 462 and 463 perform inverse operations of their corresponding encoders 426 and 427, their specific implementations (i.e., in software, hardware, or firmware) being similar to that of the encoders in a particular embodiment.

Switch 465 (a single-pole double throw switch in one embodiment), generates a stream of reconstructed transform coefficients 465a by selectively choosing between the decoded perceptually relevant and irrelevant coefficients. The stream of reconstructed transform coefficients 465a is thus substantially similar, if not identical to the stream of transform coefficients 421a generated in the encoder 420.

The manner by which switch 465 is informed to select between the perceptually relevant and irrelevant decoded data to reconstruct a true copy of the transform stream 421a can vary under the present invention. In one embodiment, the switch possesses a priori knowledge (perhaps through a previous synchronization operation or by embedded programming) as to which coefficient is needed in the present frame in order to reconstruct a true copy of the original data stream 421a. Alternatively, the switch 465 may be informed by the de-multiplexed PRC record which coefficient is needed in the present frame.

Should the encoding system 420 include a transform module 421, the decoding system 460 will preferably include an inverse transform module 466 which operates in a complementary fashion. Accordingly, it applies the inverse domain transformation operation on the reconstructed transform coefficient stream 465a to generate the decoded version of the input signal. In a particular embodiment, inverse transform module employs the inverse transformation operation as described in applicant's co-pending application entitled "Method for Performing a Domain Transformation of a Digital Signal form the Time Domain into the Frequency Domain and Vice Versa". Further particularly, the reconstructed data stream 465a comprises a block of two parallel data streams which are processed concurrently to provide two concurrently produced blocks of decoded data, as described in the applicant's concurrently filed patent applications. The inverse transform module 466 is typically, albeit not exclusively, implemented in the same manner as the transform module 421 by means of software, hardware, firmware or a combination of these.

Figure 5:
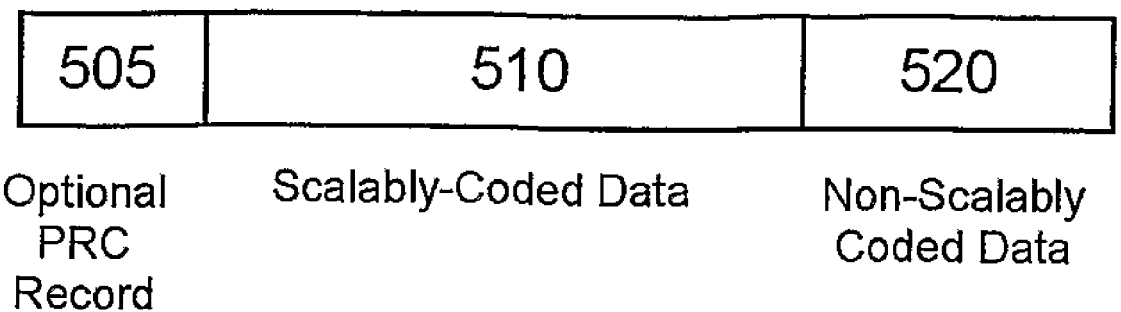
FIG. 5 illustrates one embodiment of a bit stream which is produced by the scalable encoder of FIG. 4.

FIG. 5 illustrates a scalable bit stream produced by the encoding system 420, in accordance with one embodiment of the present invention. In one embodiment, the scalable bits 510 are positioned at/near the beginning of the data frame, and the non-scalable bit 520 near the end of the frame. This arrangement allows the non-scalable coefficients 520 to be truncated (e.g., because of transmission through a narrow bandwidth channel), thereby preserving the scalable coefficients 510. In the embodiment in which the PRC record 425 is used, it may be attached as a preamble 505 ahead of the scalable coefficients 510, so as to inform the decoding system which coefficients are to be used during the signal reconstruction process.

The present invention has wide applicability in coding system, and is particularly advantageous in a scalable to lossless coding system where the coding system generates a bitstream that, if not truncated, can be decoded to a mathematically lossless reconstruction to the original signal. In such a coding system, a large amount of the perceptually irrelevant components, which would usually be discarded in a normal scalable coding system, still need to be transmitted in the lossless bit-stream to meet this lossless coding constraint. As a result, it's the coding efficiency and performance can be significantly improved using the system and methods of the present invention.

INCORPORATED REFERENCES

The following references are herein incorporated by reference in their entirety for all purposes:

R. Yu, Xiao Lin, S. Rahardja and H. Huang, "Proposed Core Experiment for improving coding efficiency in MPEG-4 audio scalable coding (SLS)" International Organization for Standarisation, Organization, Coding of Moving Pictures and Audio, ISO/IEC JTC1/SC29/WG11, MPEG2003/M10136, October 2003, Brisbane, Australia;

J. Li, "Embedded audio coding (EAC) with implicit auditory masking", ACM Multimedia 2002, Nice, France, December 2002;

R. Geiger, J. Herre, J. Koller, and K. Brandenburg, "INT-MDCT—A link between perceptual and lessless audio coding," IEEE Proc. ICASSP 2002;

T. Moriya, N. Iwakami, T. Mori, and A. Jin, "A design of lossy and lossless scalable audio coding," IEEE Proc. ICASSP 2000;

R. Yu, X. Lin, S. Rahardja and C. C. Ko, "A Fine Granular scalable perceptually lossy and lossless audio codec", IEEE Proc. ICME 2003;

M. Raad and A. Mertings, "From Lossy to Lossless Audio Coding Using SPIHT", Proc. 5th International Conference of Digital Audio Effect, 2003;

A. Said and W. A. Pearlman, "A New, Fast, and Efficient Image Codec based on Set Partitioning in Hierarchical Trees," IEEE Transactions on Circuits and Systems For Video Technology, vol. 6, no. 3, pp. 243-250, June 1996;

R. Yu and et al, "Bit Plane Golomb Coding for Sources with Laplacian Distributions," ICASSP 2003; and Khalid Sayhood, "Introduction to Data Compression," Morgan Kaufmann, 2000.

While the above is a detailed description of the present invention, it is only exemplary and various modifications, alterations and equivalents may be employed in various apparti and processes described herein. Accordingly, the scope of the present invention is hereby defined by the metes and bounds of the following claims.

What is claimed is:

1. A method for scalably encoding data, comprising:
   receiving a data stream comprising a plurality of data;
   classifying, based upon at least one predetermined criteria, each of the plurality of data as either (i) perceptually relevant data or (ii) perceptually irrelevant data;
   scalably coding the perceptually relevant data;
   non-scalably coding the perceptually irrelevant data; and
   combining the scalably coded perceptually relevant data and the non-scalably coded perceptually irrelevant data into a coded data stream.

2. The method of claim 1, wherein receiving a plurality of data comprises receiving plurality of coefficients produced through a discrete transformation.

3. The method of claim 2, wherein the discrete transformation comprises a Discrete Cosine Transformation, a Modified Discrete Cosine Transformation, a Discrete Wavelet Transformation, or a Discrete Fourier Transformation.

4. The method of claim 1, wherein each of the data comprises a frequency component, and wherein classifying comprises classifying, based upon the frequency component of each data, said data as either (i) perceptually relevant data or (ii) perceptually irrelevant data.

5. The method of claim 1, wherein each of the data comprises an energy level component, and wherein classifying comprises classifying, based upon the energy level component of each data, said data as either (i) perceptually relevant data or (ii) perceptually irrelevant data.

6. The method of claim 1, wherein each of the data comprises a perception significance component, and wherein classifying comprises classifying, based upon the perception significance component of each data, said data as either (i) perceptually relevant data or (ii) perceptually irrelevant data.

7. The method of claim 1, further comprising:
   generating a perceptual relevance/irrelevance record comprising information as to which data are perceptually relevant and which data are perceptually irrelevant; and
   combining the perceptual relevance/irrelevance record with the scalably-coded data and the non-scalably coded data in the coded data stream.

8. The method of claim 1, wherein scalably coding the perceptually relevant data comprises bit plane coding the perceptually relevant data.

9. The method of claim 1, wherein non-scalably coding the perceptually irrelevant data comprises Huffman coding the perceptually irrelevant data.

10. The method of claim 1, wherein non-scalably coding the perceptually irrelevant data comprises arithmetically coding the perceptually irrelevant data.

11. The method of claim 1, further comprising discarding from the coded data stream, one or more of the non-scalably coded perceptually irrelevant data.

12. The method of claim 1, wherein the scalably coded perceptually relevant data is combined onto the data stream ahead of the non-scalably coded perceptually irrelevant data.

13. A method for scalably decoding data, comprising:
   receiving a coded data stream comprising perceptually relevant coded data and coded perceptually irrelevant coded data;
   scalably decoding the perceptually relevant coded data into perceptually relevant decoded data;
   non-scalably decoding the perceptually irrelevant coded data into perceptually irrelevant decoded data; and combining the perceptually relevant and irrelevant decoded data into a decoded data stream.

14. The method of claim 13, wherein scalably decoding the perceptually relevant coded data comprises bit plane decoding the perceptually relevant data.

15. The method of claim 13, wherein non-scalably decoding the perceptually irrelevant coded data comprises Huffman decoding the perceptually irrelevant data.

16. The method of claim 13, wherein non-scalably decoding the perceptually irrelevant coded data comprises arithmetically decoding the perceptually irrelevant data.

17. The method of claim 13, wherein the coded data stream comprises a perceptual relevance/irrelevance record comprising information as to which coded data are perceptually relevant coded data and which coded data are perceptually irrelevant coded data, and wherein the perceptual relevance/irrelevance record is used to construct the decoded data stream.

18. The method of claim 13, further comprising taking the discrete transform of the data stream to obtain a decoded signal.

19. The method of claim 18, wherein the discrete transform comprises an Inverse Discrete Cosine Transform, an Inverse Modified Discrete Cosine Transformation, an Inverse Wavelet Transform or an Inverse Fast Fourier Transform.

20. A system operable to scalably encode data, the system comprising:
a perceptual relevance classifier having an input configured to receive a data stream comprising a plurality of data, the data classifier operable to classify, based upon at least one predetermined criteria, each of the plurality of data as either (i) perceptually relevant data, or (ii) perceptually irrelevant data
a scalable coder having an input configured to receive the perceptually relevant data and to apply scalable coding thereto to produce coded perceptually relevant data;
a non-scalable coder having an input configured to receive the perceptually irrelevant data and to apply non-scalable coding thereto to produce coded perceptually irrelevant data;
a multiplexer having first and second inputs coupled to receive the coded perceptually relevant and irrelevant data, respectively, the multiplexer operable to combine the coded perceptually relevant and irrelevant data into a coded data stream.

21. The system of claim 20, wherein the data comprises a plurality of coefficients produced through a discrete transformation.

22. The system of claim 20, wherein the discrete transformation comprises a Discrete Cosine Transformation, a Modified Discrete Cosine Transformation, a Discrete Wavelet Transformation or a Discrete Fourier Transformation.

23. The system of claim 20, wherein each of the data comprises a frequency component, and wherein the perceptual relevance classifier is operable to classify, based upon the frequency component of each data, said data as either (i) perceptually relevant data or (ii) perceptually irrelevant data.

24. The system of claim 20, wherein each of the data comprises an energy level component, and wherein the perceptual relevance classifier is operable to classify, based upon the energy level component of each data, said data as either (i) perceptually relevant data or (ii) perceptually irrelevant data.

25. The system of claim 20, wherein each of the data comprises a perception significance component, and wherein the perceptual relevance classifier is operable to classify, based upon the perception significance component of each data, said data as either (i) perceptually relevant data or (ii) perceptually irrelevant data.

26. The system of claim 20, wherein the perceptual relevance classifier is further operable to generate a perceptual relevance/irrelevance record comprising information as to which data are perceptually relevant and which data are perceptually irrelevant, and wherein the multiplexer is further operable to combine the perceptual relevance/irrelevance record with the coded perceptually relevant and irrelevant data in the coded data stream.

27. The system of claim 20, wherein the scalable coder comprises a bit plane encoder.

28. The system of claim 20, wherein the non-scalable coder comprises a Huffman encoder.

29. The system of claim 20, wherein the non-scalable coder comprises an arithmetic encoder.

30. The system of claim 20, further comprising means for discarding from the coded data stream, one or more of the non-scalably coded perceptually irrelevant data.

31. The system of claim 20, wherein the multiplexer is operable to combine the scalably coded perceptually relevant data onto to the data stream ahead of the non-scalably coded perceptually irrelevant data.

32. A system for scalably decoding data, comprising:
a demultiplexer having an input operable to receive a coded data stream comprising perceptually relevant and irrelevant coded data, a first output operable to provide the perceptually relevant coded data, and a second output operable to provide the perceptually irrelevant data;
a scalable decoder coupled to receive the coded perceptually relevant data and to apply scalable decoding thereto to produce decoded perceptually relevant data;
a non-scalable decoder having an input configured to receive the coded perceptually irrelevant data and to apply non-scalable decoding thereto to produce decoded perceptually irrelevant data; and
a switch having an input switchable between a first port coupled to receive the decoded perceptually relevant data and a second port coupled to receive the decoded perceptually irrelevant data, the switch further comprising an output for providing a decoded data stream.

33. The system of claim 32, wherein the scalable decoder comprises a bit plane decoder.

34. The system of claim 32, wherein the non-scalable decoder comprises a Huffman decoder.

35. The system of claim 32, wherein the non-scalable decoder comprises an arithmetic decoder.

36. The system of claim 32, wherein:
the coded data stream comprises a perceptual relevance classification record comprising information as to which coded data are perceptually relevant coded data and which coded data are perceptually irrelevant coded data,
the switch has a second input is coupled to receive the perceptual relevance classification record, and
the switch, response to perceptual relevance classification record, selects between the first or second input ports to sequentially construct the decoded data stream.

37. The system of claim 32, further comprising discrete transform means having an input for receiving the decode input stream and an output, the discrete transform means operable to apply a discrete transform algorithm to produce a decoded signal.

38. The system of claim 37, wherein the discrete transform comprises an Inverse Discrete Cosine Transform, an Inverse Modified Discrete Cosine Transformation, an Inverse Wavelet Transform or an Inverse Discrete Fourier Transform.

39. A computer program product resident on a computer readable medium, the computer program product operable to execute instructions for scalably encoding a plurality of received data, the computer program product comprising:
  code for classifying, based upon at least one predetermined criteria, each of the plurality of received data as either (i) perceptually relevant data or (ii) perceptually irrelevant data;
  code for scalably coding the perceptually relevant data;
  code for non-scalably coding the perceptually irrelevant data; and
  code for combining the scalably coded perceptually relevant data and the non-scalably coded perceptually irrelevant data into a coded data stream.

40. The computer program product of claim 39, wherein each of the data comprises a frequency component, and wherein the code for classifying comprises code for classifying, based upon the frequency component of each data, said data as either (i) perceptually relevant data or (ii) perceptually irrelevant data.

41. The computer program product of claim 39, wherein each of the data comprises an energy level component, and wherein the code for classifying comprises code for classifying, based upon the energy level component of each data, said data as either (i) perceptually relevant data or (ii) perceptually irrelevant data.

42. The computer program product of claim 39, wherein each of the data comprises a perception sensitivity component, and wherein the code for classifying comprises code for classifying, based upon the perception sensitivity component of each data, said data as either (i) perceptually relevant data or (ii) perceptually irrelevant data.

43. The computer program product of claim 39, wherein code for scalably coding the perceptually relevant data comprises bit plane coding.

44. The computer program product of claim 39, wherein code for non-scalably coding the perceptually irrelevant data comprises Huffman coding.

45. The computer program product of claim 39, wherein code for non-scalably coding the perceptually irrelevant data comprises arithmetic coding.

46. The computer program product of claim 39, wherein code to combine comprises code to combine the scalably coded perceptually relevant data onto to the data stream ahead of the non-scalably coded perceptually irrelevant data.

47. A computer program product resident on a computer readable medium, the computer program product operable to execute instructions for scalably decoding a coded data stream comprising perceptually relevant coded data and coded perceptually irrelevant coded data, the computer program product comprising;
  code for scalably decoding the perceptually relevant coded data into perceptually relevant decoded data;
  code for non-scalably decoding the perceptually irrelevant coded data into perceptually irrelevant decoded data; and
  code for combining the perceptually relevant and irrelevant decoded data into a decoded data stream.

48. The computer program product of claim 47, wherein code for scalably decoding the perceptually relevant coded data comprises bit plane coding.

49. The computer program product of claim 47, wherein code for non-scalably decoding the perceptually irrelevant coded data comprises Huffman coding.

50. The computer program product of claim 47, wherein code non-scalably decoding the perceptually irrelevant coded data comprises arithmetic coding.

* * * * *